April 24, 1962   J. L. TUCK   3,031,398
HIGH ENERGY GASEOUS PLASMA CONTAINMENT DEVICE
Filed Sept. 2, 1959   3 Sheets-Sheet 1

WITNESSES:
Henry Hyman
Victor L. Laslo

INVENTOR.
James L. Tuck
BY
Roland A. Anderson

April 24, 1962 J. L. TUCK 3,031,398
HIGH ENERGY GASEOUS PLASMA CONTAINMENT DEVICE
Filed Sept. 2, 1959 3 Sheets-Sheet 3

WITNESSES:

INVENTOR.
James L. Tuck

3,031,398
HIGH ENERGY GASEOUS PLASMA CONTAINMENT DEVICE

James L. Tuck, Los Alamos, N. Mex., assignor to the United States of America as represented by the United States Atomic Energy Commission
Filed Sept. 2, 1959, Ser. No. 837,761
2 Claims. (Cl. 204—193.2)

The present invention is directed to means for confining a gaseous plasma by electromagnetic means.

The novel approach employed in the present invention is that of directing a jet of a gaseous plasma into a magnetic field having such a configuration that the plasma, once having penetrated into the field, is trapped therein. The critical relation herein disclosed between the magnetic field intensity and the density and energy of the plasma jet is such that the jet will penetrate through a region of the trapping field if the magnetic intensity in such region lies below a certain critical value, as will be shown in detail below.

In the best mode of practicing the present invention, the plasma jet is injected into the magnetic field at a very high energy, and the magnetic field strength is not thereafter altered. Accordingly, the description below includes a complete description of means for injecting such a high energy plasma jet into a steady state magnetic field having an intensity satisfying the critical relation mentioned above.

Figure 1:
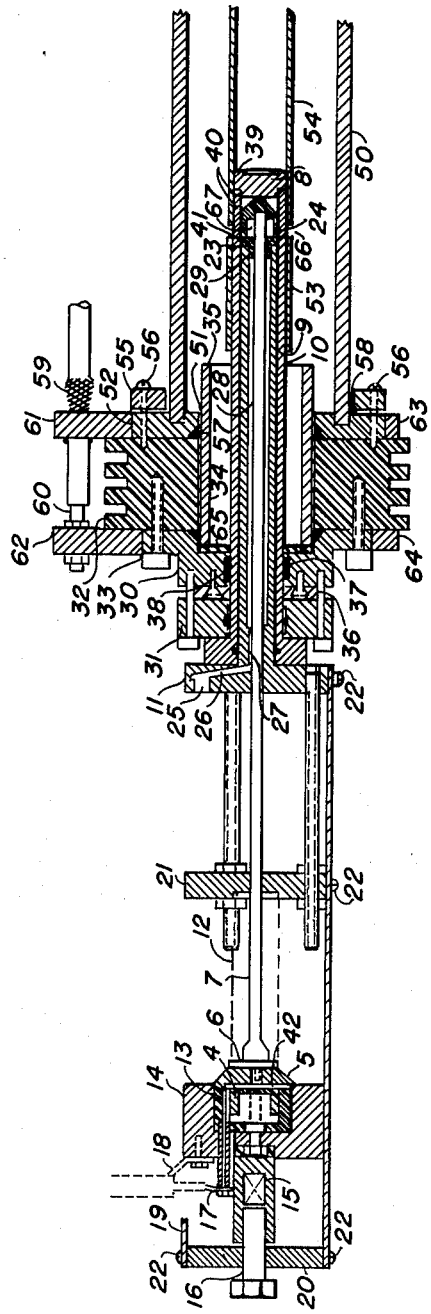
Figure 2:
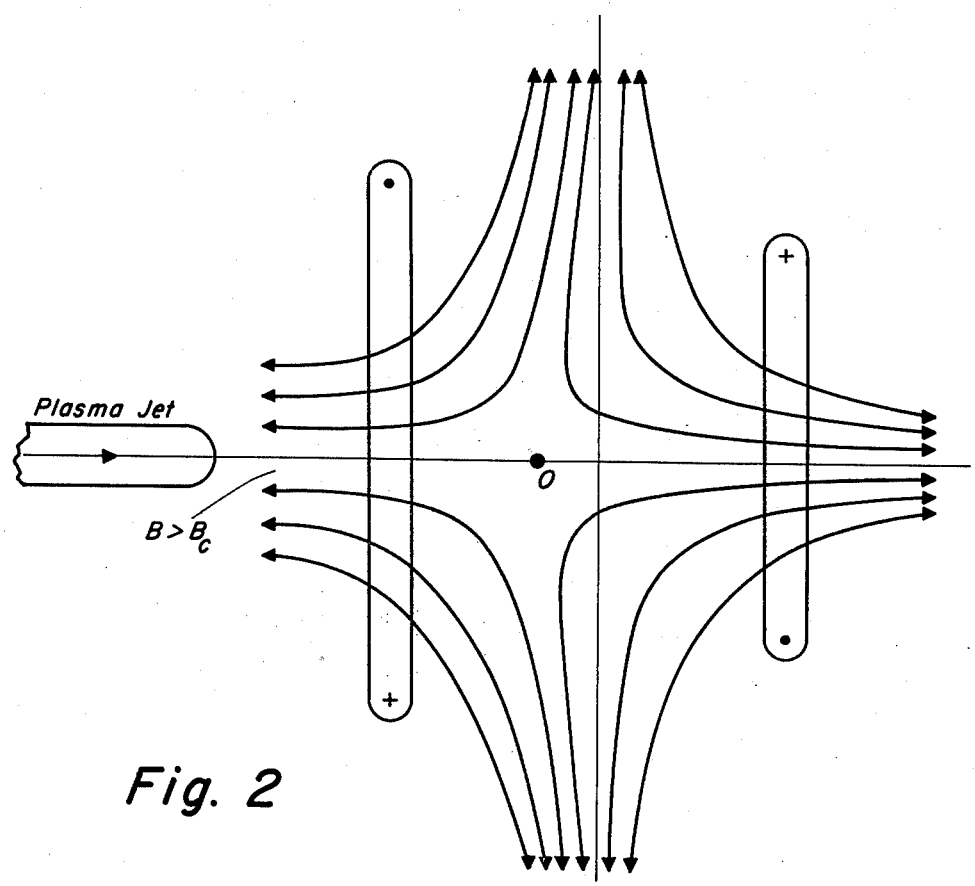
Figure 3:
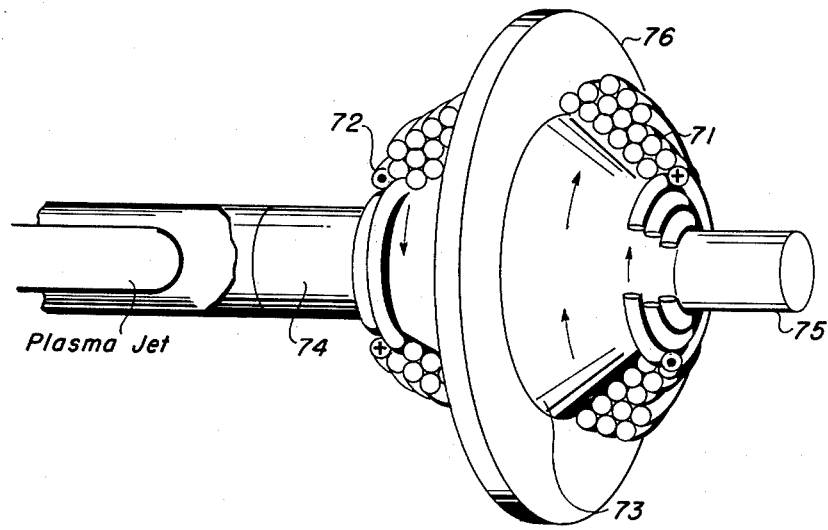

The present invention can be easily comprehended by reference to the accompanying drawings in which:

FIGURE 1 illustrates one embodiment of an apparatus for producing and accelerating a plasma to high energies, FIGURE 2 illustrates schematically one form of magnetic field into which a plasma jet may be injected, and FIGURE 3 illustrates apparatus for producing the magnetic field of FIGURE 2 and confining the plasma injected therein.

The apparatus as a whole consists of a plasma trapping apparatus, a plasma accelerator and a valve for admitting controlled quantities of gaseous plasma into the accelerator. There are various ways in which the valve may be joined to accelerator for this purpose, FIGURE 1 illustrating a method of admitting the gas coaxially from the center electrode. In other embodiments, not illustrated, the two electrodes of the accelerator run coaxially for its entire length and the gas is admitted through an orifice in the outer electrode behind the breech end of the accelerator, defining as the breech end the cross-sectional plane where radial conduction between electrodes commences.

The manner of making and using the valve and accelerator can be more clearly understood by reference to FIGURE 1, which shows an embodiment of the valve and accelerator in longitudinal section. The main elements of the valve are the coil 4, aluminum anvil 5 securely affixed to the head 6 of the steel valve stem 7, the steel valve head 8, brass inner sleeve 9, brass outer sleeve 10, brass end plate 11 and steel spring 12. Note that end plate 11 and inner sleeve 9 are actually a single element, and that valve stem 7 and valve head 8 are threaded together to form an integrated unit. Coil 4 is firmly embedded in epoxy resin 13 cast into brass cup 14, the latter being free to recoil to the left against recoil spring 15 and adjustable screw 16. Power is supplied to coil 4 from a capacitor by a timed ignitron, neither of which is shown, through the conductors 17 and 18 of a coaxial cable, lead 18 being connected to the inside turn of the spiral coil 4 through brass cup 14.

One sub-assembly of the valve consists of the above-enumerated elements with the exception of outer sleeve 10, as held together by the cylindrical brass casing 19, end plates 11 and 20 and center support plate 21 being affixed thereto by screws 22. Threaded into the inside-shouldered end 23 of sleeve 9 there is a mating Teflon (polyperfluoroethylene) gasket 24 to provide a sealing engagement between such end 23 and the corresponding surface of valve head 8. Gas is admitted from external tubing not shown into gas entry port 25 in end plate 11, conducted through passage 26 of the latter to its axial bore 27, the latter being oversize as shown to define an annular gas passageway surrounding valve stem 7. The bore of sleeve 9 is likewise oversize to provid a similar passage surrounding valve stem 7, enlarged at the right side as shown to provide a larger annular space 28, the latter being contiguous and coaxial with a similar annulus 29 between gasket 24 and valve stem 7. Annulus 29 empties into plenum 67 inside the valve head 8. Prior to actuation of the valve, there is thus a volume of gas within plenum 67.

The other valve sub-assembly consists primarily of the flanged brass plate 30, brass plate 31 and insulating cylinder 32, the latter being secured to plate 30 by screws 33 to compress rubber O-ring 34 and thereby secure the sub-assembly to the glass (Vycor) insulating tube 35 of the body of the accelerator 2. Between plates 30 and 31 is a smaller brass plate 36, also secured to plate 30 by screws, the function of which is to compress Teflon gaskets 37 and O-ring 38 to provide a seal around outer sleeve 10. Plate 31 is made with a longitudinal saw cut and is drilled and threaded across such cut so that when an appropriate screw (not shown) is inserted and tightened, the cut will close and sleeve 10 will be firmly fixed in position. A Teflon gasket 65 is provided to prevent breakage of the glass tube 35.

For about an inch to the left of the solid cap 39 of sleeve 10, the walls of the sleeve are cut away to leave only four narrow ribs 40 connecting cap 39 and sleeve body 41. The left ends of the corresponding openings are, of course, calculated to fall at or to the left of the gap created by the movement of valve head 8 to the right, and thereby to provide flow channels through gap 66 into the interior of the accelerator defined by the wall 50.

The valve is joined to the accelerator by fitting glass tube 35 through the opening 51 of flanged stainless steel end plate 52, the latter being threaded to the cylindrical copper body 50, and by fitting center electrode sections 53 and 54 over outer sleeve 10 of the valve, electrical contact between the latter elements being insured by soldering. The assembly is completed by joining sleeve 55 to insulating cylinder 32, through appropriate holes in end plate 51, by screws 56. O-rings 57 and 58 are compressed during assembly to prevent leakage.

Electrical connections to center electrode 53—54 and outer electrode (or body) 50 are established through conductors 59 and 60 of a group of coaxial cables, only one of which is shown, the former being connected to upper brass yoke 61 and the latter to upper brass yoke 62. Upper yoke 61 is connected to a corresponding lower yoke 63 by screws (not shown) which are tightened to establish good mechanical and electrical contact with end plate 52. Upper yoke 62 is similarly connected to lower yoke 64 to establish contact with plate 30, and is thus connected through sleeve 10 to center electrode sections 53 and 54.

In operation, upon connecting coil 4 to its capacitor supply, a rapidly rising magnetic field is created. The magnetic flux on the right of the coil is squeezed into the narrow gap 42 (0.3 millimeter) between coil 4 and anvil 5. The magnetic pressure of this constricted field exerts a force on anvil 5 similar to a hammer blow, driving valve stem 7 and valve head 8 to the right and compressing spring 12. Gas flows from plenum 67 through the gap thereby created, between ribs 40 and gap 66 between center electrode sections 53 and 54 into the chamber defined by outer electrode 50 and previously containing only a hard vacuum. The time required for operation of the valve is less than 100 microseconds, during which about 0.1 cm.$^3$ of deuterium at standard temperature and pressure is admitted. This quantity of gas may, of course, be varied by increasing the size of the plenum, increasing the open time of the valve, etc.

While it is apparent that an impulse from a hammer blow or a falling weight on anvil 5 would produce similar results, the use of an electromagnetic hammer as above has the advantage that it can be more closely coordinated with other electrical controls to provide an orderly sequence of command signals to the entire accelerator and reactor, as through timing apparatus connected to both the supply to coil 4 and a condenser bank supplying the accelerator through a group of ignitrons.

The accelerator is filled with a gas by opening the electromagnetic valve. At an appropriate time after the admission of the gas, such that the gas which may be hydrogen has had time to distribute itself along the length of the accelerator but not to reach the region beyond the muzzle end of the electrodes, the ignitrons are triggered to apply the voltage of the capacitors across the electrodes, and the $$\vec{j} \times \vec{B}$$

force of the magnetic field around the central electrode acting upon the discharge is such as to drive the ionized gas axially out of the muzzle end of the gun.

The force applied to the plasma is all due to magnetic field, and the field is everywhere at right angles to the force. Therefore the force is the integral of the magnetic pressure over the area of the gun. In coaxial cylindrical geometry this becomes $$f = \int_{r_1}^{r_2} \frac{B^2}{8\pi} 2\pi r \, dr = i^2 \ln \frac{r_2}{r_1}$$

where $r_1$ and $r_2$ are the outside diameter of the inner electrode and the bore of the outside electrode, respectively, in centimeters, and the force is given in dynes if the current is measured in E.M.U. If the current is measured at the terminals of the gun, and the above expression evaluated and integrated in time, the result should be the maximum possible total impulse. In practice the impulse should be smaller because of friction between the plasma and the walls of the gun.

In experiments with the embodiment of FIGURE 1, the following parameters were used:

| | |
|---|---|
| Bore of outer electrode | 2⅞ in. |
| Diameter of center electrode | 1¼ in. |
| Axial distance between point of gas entry and breech end of accelerator (near end of 35) | 2½ in. |
| Axial distance between point of entry of gas and muzzle end of electrodes | 7 in. |
| Type and quantity of gas admitted | $H_2$, 0.1 cm.$^3$ S.T.P. |
| Time between starting the admission of such gas and pulsing of electrodes | 300 μsec. |
| Energy of capacitor bank discharged into accelerator | 1500 joules |
| Capacitance of bank | 30 μf. |
| Period of discharge pulse | 15 μsec. |

These experiments under the above conditions indicated that all of the gas admitted is accelerated to a speed of about 10$^7$ cm./sec. They also indicated that the plasma leaves the accelerator uncontaminated by electrode material slightly after the current maximum of the first half cycle of the oscillatory current discharge.

Experiments have also been performed with a modified version of the FIGURE 1 embodiment, the essential difference being that the valve structure was removed from the accelerator as shown and re-connected thereto by tubing connected at an orifice in outer electrode 50. All structure to the left of element 30 in FIGURE 1 was removed, as were the valve head and stem and sleeve of the valve, and a single-piece center electrode was inserted and extended through element 30, where it was closed with a cap. Glass insulator 35 was extended to the right and the gas was admitted through a 1¾-inch diameter orifice in electrode 50 with its center line about 2½ inches to the left of the right hand end of insulator 35. The center electrode used had an outside diameter of one inch, and the bore of the outer electrode was 3¼ inches.

Using the above-described modified accelerator with a valve of larger capacity, 1 cc. of $H_2$ S.T.P. was admitted to the previously evacuated accelerator in less than 100 microseconds. At about 500 microseconds after the admission of the gas, the electrodes were energized from a capacitor bank storing 5000 joules of energy, the period of the circuit being about 12 microseconds.

Under the above conditions, the peak current to the accelerators was measured at about 200,000 amperes. The energy of the plasma jet was investigated by suspending a cup-shaped copper pendulum in a vacuum chamber attached to the muzzle end of the accelerator with the pendulum about 5 cm. from such end. The momentum imparted to the pendulum was determined by measuring its swing and the energy imparted to it was determined by measuring its temperature rise. Under these conditions, the velocity of the plasma jet was found to be $1.1 \times 10^7$ cm./sec. and the corresponding kinetic temperature was found to be 60 ev.

Further experiments with such modified embodiment were performed by attaching a long vacuum tube to the muzzle end of the accelerator and wrapping a solenoid coil around such vacuum tube. Various D.C. currents were supplied to this coil to obtain steady state magnetic fields in the vacuum of various intensities. Penetration of the plasma jet into such a field was determined by measuring perturbations of the magnetic field inside the coil. Under conditions such that the plasma jet directed into this field had a density of about 10$^{16}$ protons/cm.$^3$ and a speed of about $5 \times 10^6$ cm./sec., it was found that the critical magnetic field strength is about 10,000 gausses. Above this value, there was no pentration of the field by the plasma, as evidenced by the fact that no E.M.F.'s were induced in a small pick-up probe coil inserted in the field. Below such value, the field was penetrated, as indicated by magnetic signals picked up by such probes.

FIGURE 2 illustrates in cross-section the cusped variety of the magnetic field configuration now commonly known as a "picket fence." This type of field may be produced, for instance, by supplying currents to the two coils indicated in opposite directions, as shown. The ideal picket fence configuration has been modified as indicated so that the magnetic field intensity at the point of entry of the plasma ejected from the muzzle end of the accelerator is less than $B_c$, the critical field value determined by the relation $$B_c^2 = 12\pi \rho_0 v_0^2 = 7.7 \times 10^2 j \sqrt{E}$$

where $\rho_0$ = maximum density of plasma jet
$v_0$ = velocity of jet as it enters the magnetic field
$j$ = deuteron equivalent current density in amps./cm.$^2$
$E$ = deuteron energy in electron volts This relation has been established by equating the magnetic pressure on a moving interface between a magnetic field and a plasma to the pressure exerted by such a plasma, and then setting the speed of the interface equal to zero.

Inside the region indicated by the magnetic lines of force of FIGURE 2 the magnetic field intensity decreases to zero at the point 0 and thereafter increases in every direction proceeding from the center. The effect of such a magnetic field configuration is to interpose between its interior and any material wall surrounding the field a magnetic "anvil," i.e., a magnetic field having an intensity $B > B_c$. The plasma as a whole is very effectively confined, and the only particles which leak out are those which, through collisions and deflections, acquire the ideal velocity to follow magnetic lines out through the cusps where the lines of force converge. By imparting higher energies to a plasma of hydrogen isotopes in the accelerator, the plasma energy and temperature may be further increased. When this is done, the magnetic field of the picket fence will confine such plasmas long enough to afford ample opportunity to study and obtain new information on the characteristics of high energy plasmas.

To illustrate the type of structure used to produce the magnetic field illustrated schematically in FIGURE 2, reference is made here to FIGURE 3 of the drawings. The essential elements of this structure are the multiple coils 71 and 72, the pressure vessel 73, the inlet orifice 74 and the exhaust ports 75 and 76. Pressure vessel 73 may be thought of as a pair of funnels with their large ends placed face to face and then cut away and fitted with the ring shaped exhaust port 76 for connection to a vacuum system. Coils 71 and 72 are then wrapped on the pressure vessel 73 and are supplied with voltages to produce the oppositely directed currents indicated. The problem of producing a magnetic field having the configuration indicated in FIGURE 2 is a field mapping problem familiar to electrical engineers, and is not elaborated here. The resulting structure also has a point cusp, or point of very high field intensity at the point diametrically opposite the gas inlet 74. A gas exhaust 75 is provided at this point for connection to the vacuum system to carry off the small amount of gas leaking out at this point.

In operating the plasma injector together with the structure of FIGURE 3, the dimensions of pressure vessel 73 may be such that only one burst of plasma is required to fill it to the initial density, or the accelerator may be pulsed repeatedly to obtain a somewhat larger volume of gas. It is also possible to further increase the plasma energy by squeezing it with a higher intensity magnetic field by increasing the currents through the coils.

While the present invention has been described above only with respect to a picket fence type of plasma confining device, it is now apparent that it may also be used, with minor modifications, in many other devices, e.g., a Stellerator or a Mirror Machine. The essential point is to inject the plasma at a point where the magnetic field intensity is less than the critical value $B_c$, in accordance with the above-described relation, the intensity decreasing thereafter in a central region but being surrounded by a field of intensity of $B > B_c$ except at the point of entry, and preferably with lines of force leaving the region of confinement only at high intensity cusps. Note that the point of plasma entry may be provided with an auxiliary field, once the plasma has been trapped, to further reduce the small amount of charged particle leakage. The picket fence type of magnetic field is preferred because it is inherently more stable than most other types of fields, because ionized particles tending to escape from the central region meet increasingly greater magnetic pressures which force them back toward the central, low field region.

What is claimed is:

1. A high energy gaseous plasma containment device comprising in combination means for accelerating a gaseous plasma to a high velocity, means for producing a magnetic field region having a zero intensity in its interior, an intensity greater than a critical value $B_c$ at all points along its border except a small jet entrance cusp and a value less than $B_c$ at said entrance cusp, said means being disposed with respect to said plasma accelerating means to present to said plasma jet first said jet entrance cusp and thereafter a region of lower magnetic field intensity, a gas container surrounding said magnetic field region having a plurality of ducts, one said duct surrounding said cusp and sealingly connected to said plasma accelerating means and said other ducts surrounding cusps where the lines of force of said magnetic field convergingly enter or leave said region and being connected to a vacuum system, said critical magnetic field intensity $B_c$ being defined by the relation $$B_c^2 = 12\pi\rho_0 v_0^2$$

where $\rho_0$ = the density of the plasma as it leaves the accelerator, and $v_0$ = the plasma velocity at such time.

2. A high energy gaseous plasma containment device comprising means for accelerating a gaseous plasma at a velocity of at least about $10^7$ cm./sec., coil means for producing a modified picket fence magnet field, said field being characterized by having two point cusps forming an axis of revolution and a ring cusp lying in a plane normal to said axis of revolution, one of said point cusps having a magnetic field intensity greater than a critical value $B_c$ and the other less than $B_c$, said ring cusp also having a magnetic field intensity greater than $B_c$, and by having a point of zero magnetic field intensity in its interior and increasingly larger magnetic field intensities proceeding from said point of zero field in any direction, a gas container surrounding said magnetic field and having an opening surrounding each said cusp, means connecting said axial cusp of weaker field strength in sealing relation to said plasma accelerating means and means connecting said other openings to a vacuum apparatus, said accelerating means being disposed to direct said plasma axially into said field at said point of lower magnetic field intensity, said critical magnetic field $B_c$ being defined by the relation:

$$B_c^2 = 12\pi\rho_0 v_0^2$$

where $\rho_0$ = the density of the plasma as it leaves the accelerator, and $v_0$ = the plasma velocity at such time.

References Cited in the file of this patent

UNITED STATES PATENTS 2,961,559    Marshall _____ Nov. 22, 1960

OTHER REFERENCES

Post: Review of Modern Physics, vol. 28, No. 3, July 1956, page 359.

Atomic Industry Reporter, News and Analysis, Official Text, section 1958, Library No. TK9001A7, issue of January 29, 1958, pages 54:5–54:11.

Proceedings of the Second United Nations International Conference on the Peaceful Uses of Atomic Energy, vol. 32, United Nations, Geneva, 1958, pages 16, 17.